(No Model.) 6 Sheets—Sheet 1.
J. F. BOWER.
COIN CONTROLLED WEIGHING AND STRENGTH TESTING MACHINE.
No. 422,876. Patented Mar. 4, 1890.
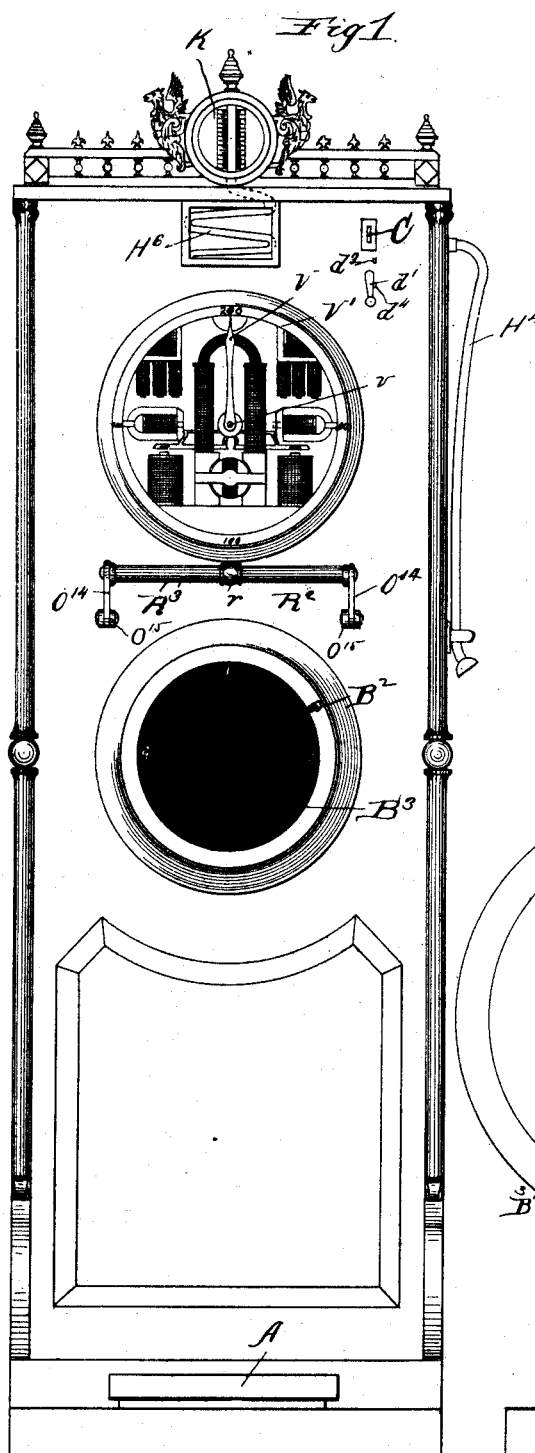
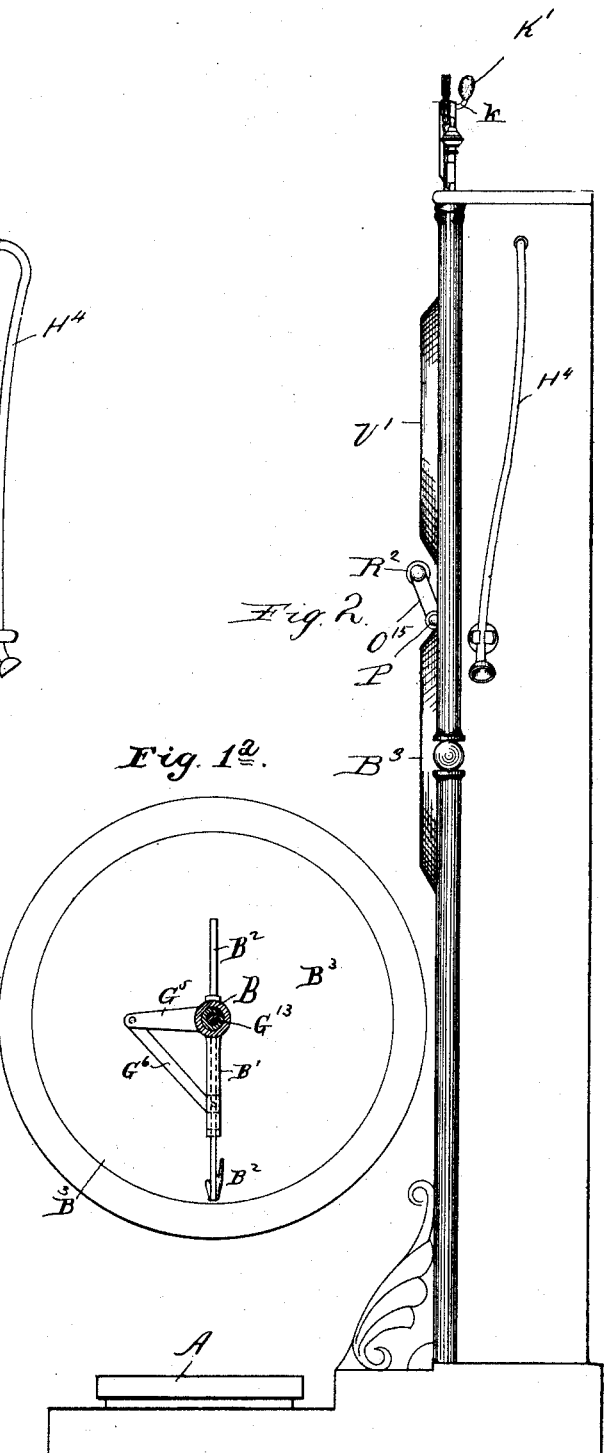

(No Model.) 6 Sheets—Sheet 2.
J. F. BOWER.
COIN CONTROLLED WEIGHING AND STRENGTH TESTING MACHINE.
No. 422,876. Patented Mar. 4, 1890.

Witnesses:
Lew. E. Curtis
Mad. A. Claflin

Inventor:
John F. Bower
By Munday Evarts & Adcock
His Attorneys (No Model.) 6 Sheets—Sheet 3.
J. F. BOWER.
COIN CONTROLLED WEIGHING AND STRENGTH TESTING MACHINE.
No. 422,876. Patented Mar. 4, 1890.

Witnesses:
Lew. E. Curtis
Mack A. Claflin

Inventor:
John F. Bower
By Munday Evarts & Adcock
His Attorneys (No Model.) 6 Sheets—Sheet 4.
J. F. BOWER.
COIN CONTROLLED WEIGHING AND STRENGTH TESTING MACHINE.
No. 422,876. Patented Mar. 4, 1890.
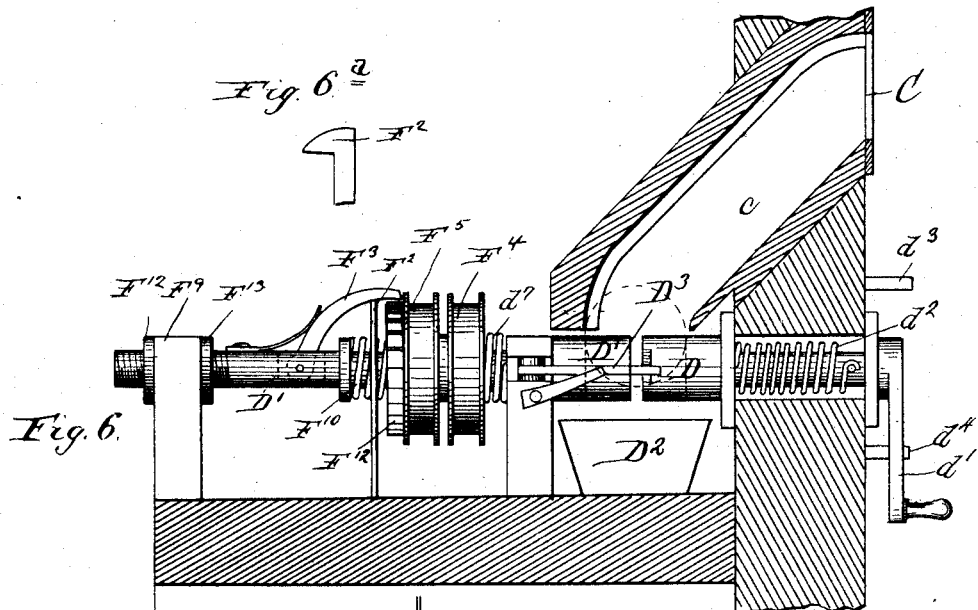
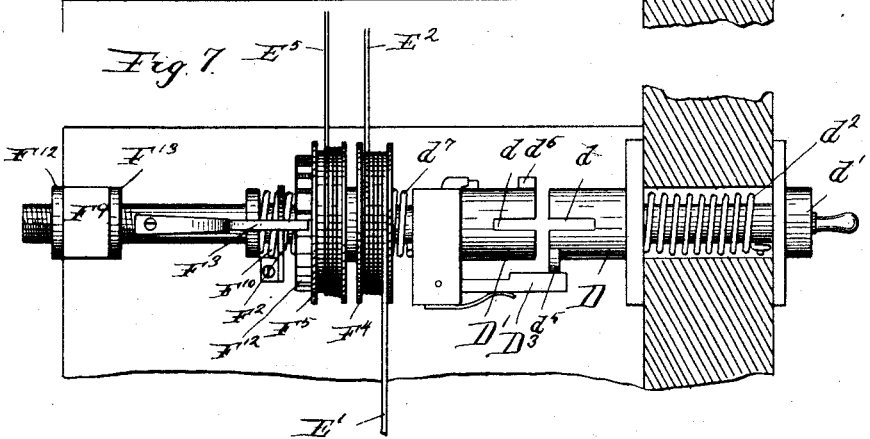
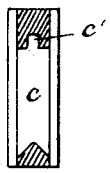
Witnesses:
Geo. C. Curtis
Mack A. Claflin
Inventor:
John F. Bower
By Munday Evarts & Adcock
His Attorneys (No Model.) 6 Sheets—Sheet 5.
J. F. BOWER.
COIN CONTROLLED WEIGHING AND STRENGTH TESTING MACHINE.
No. 422,876. Patented Mar. 4, 1890.
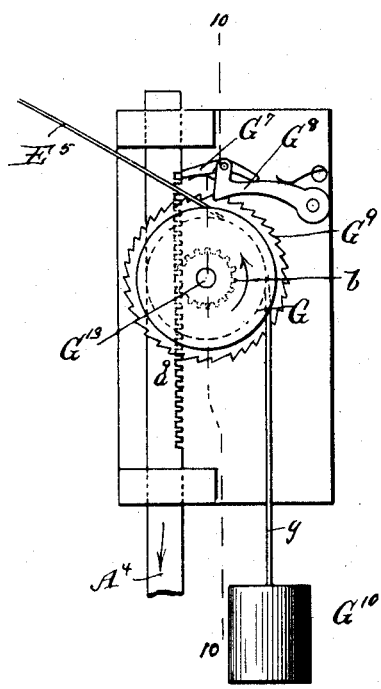
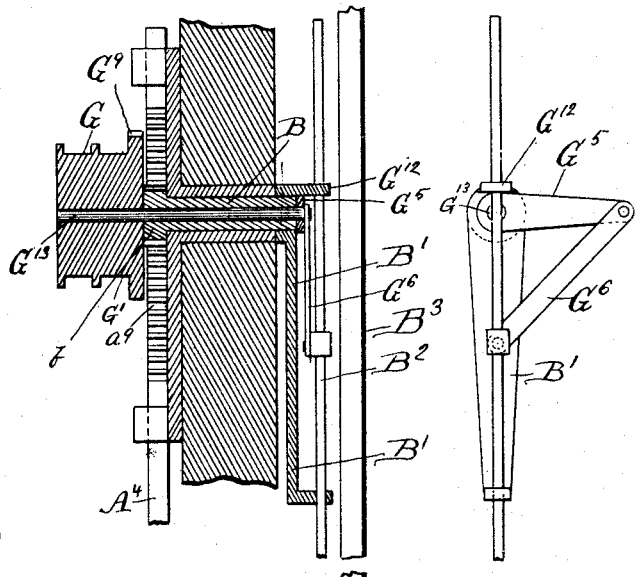
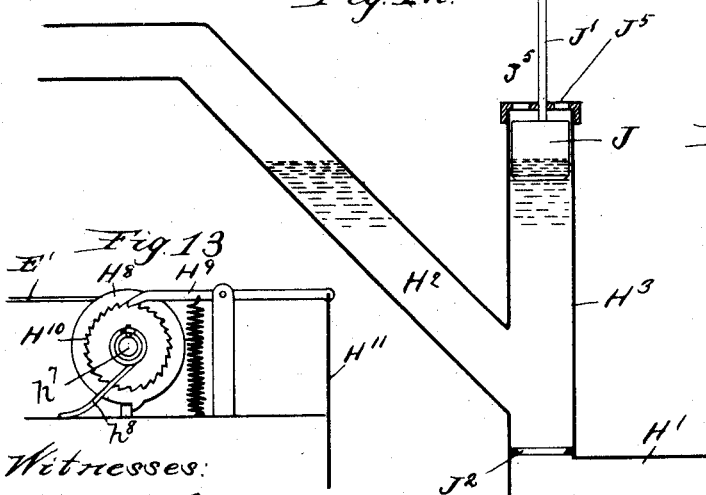
Witnesses:
Inventor:
John F. Bower
By Munday Evarts & Adcock
His Attorneys (No Model.) 6 Sheets—Sheet 6.
J. F. BOWER.
COIN CONTROLLED WEIGHING AND STRENGTH TESTING MACHINE.
No. 422,876. Patented Mar. 4, 1890.
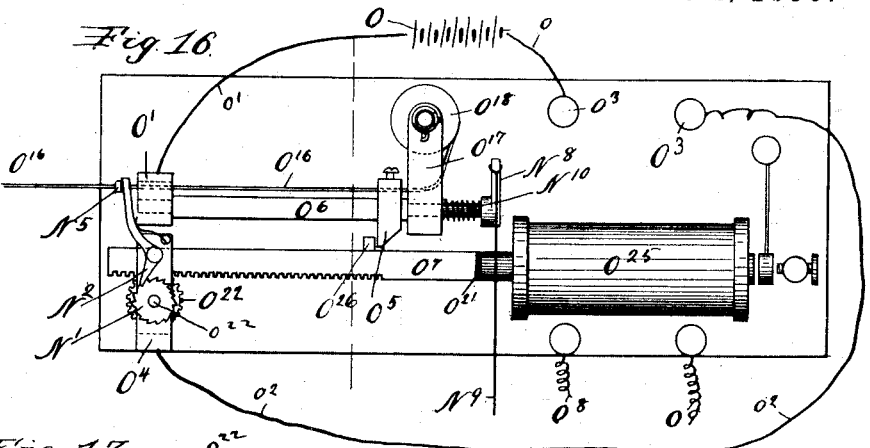
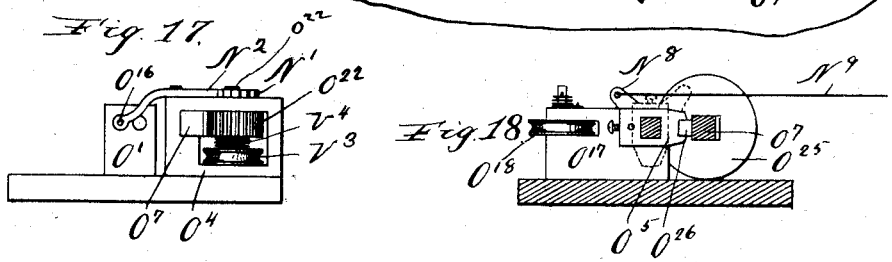
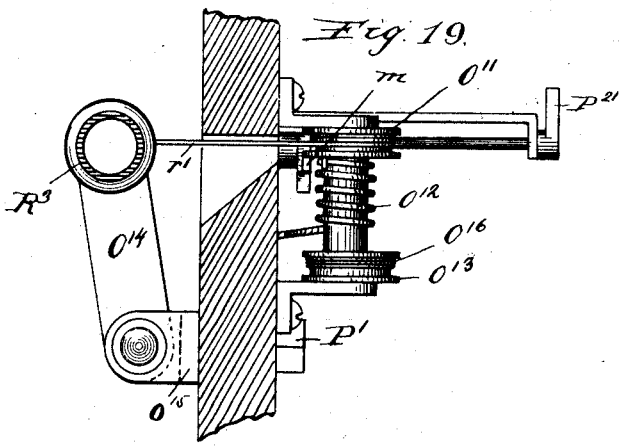
Witnesses:
Geo. C. Curtis
Mack A. Claflin
Inventor:
John F. Bower
By Munday Evarts & Adcock
His Attorneys

UNITED STATES PATENT OFFICE.

JOHN F. BOWER, OF CHICAGO, ILLINOIS, ASSIGNOR TO ORLAND D. ORVIS, OF SAME PLACE.

COIN-CONTROLLED WEIGHING AND STRENGTH-TESTING MACHINE.

SPECIFICATION forming part of Letters Patent No. 422,876, dated March 4, 1890.

Application filed March 19, 1889. Serial No. 303,863. (No model.)

*To all whom it may concern:*

Be it known that I, JOHN F. BOWER, a citizen of the United States, residing in Chicago, in the county of Cook and State of Illinois, have invented a new and useful Improvement in Coin-Controlled Weighing and Strength-Testing Machines, of which the following is a specification.

This invention relates to improvements in that class of machines which are employed for weighing the person, testing the lungs, and other purposes, and which are controlled by the introduction of a coin by a person desiring to use the apparatus.

I have endeavored to improve the machine in various respects and to produce a durable, efficient, and attractive form of machine, giving opportunity for weighing, lung-testing, and the administration of an electrical shock or current.

Figure 3:
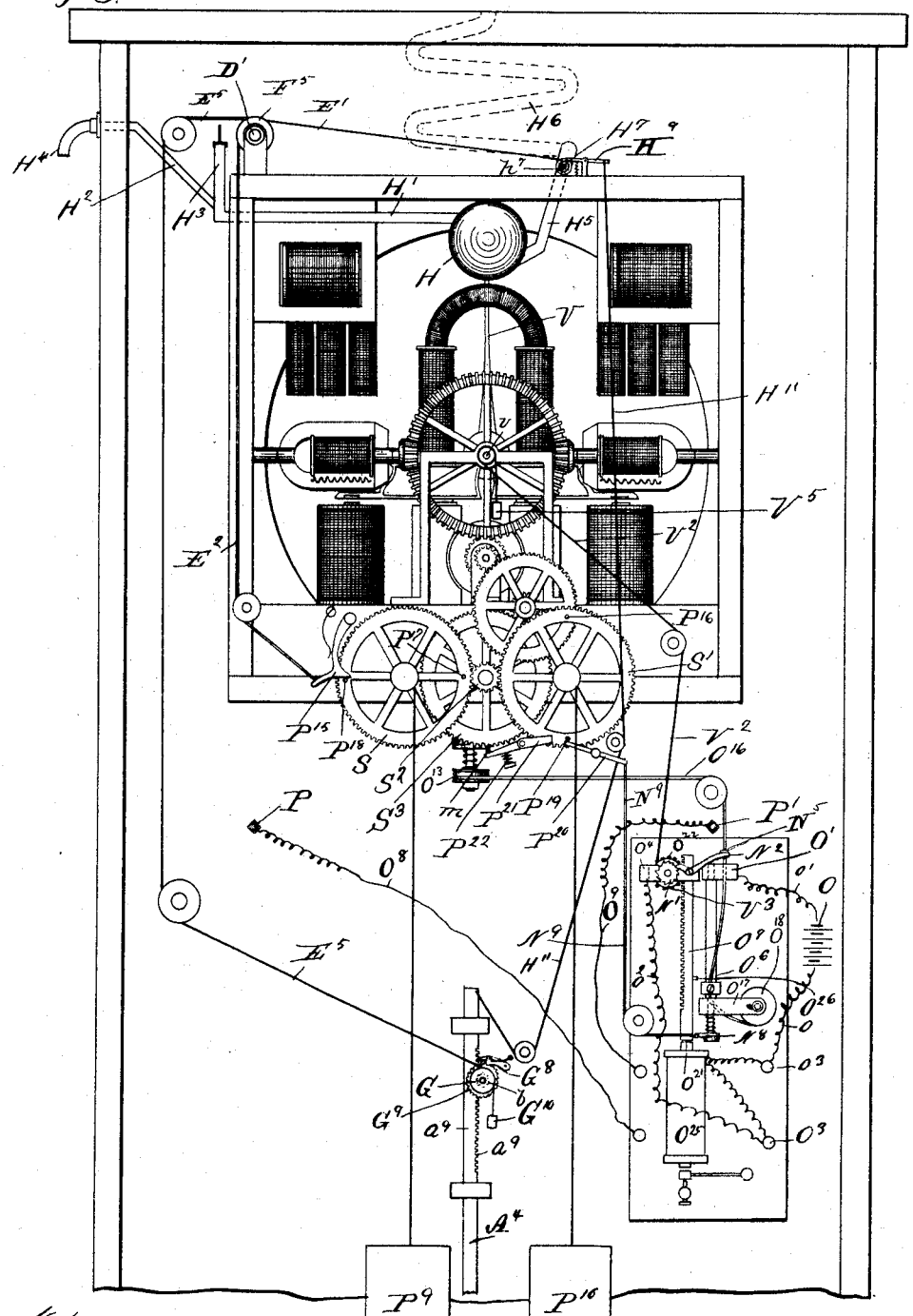
Figure 4:
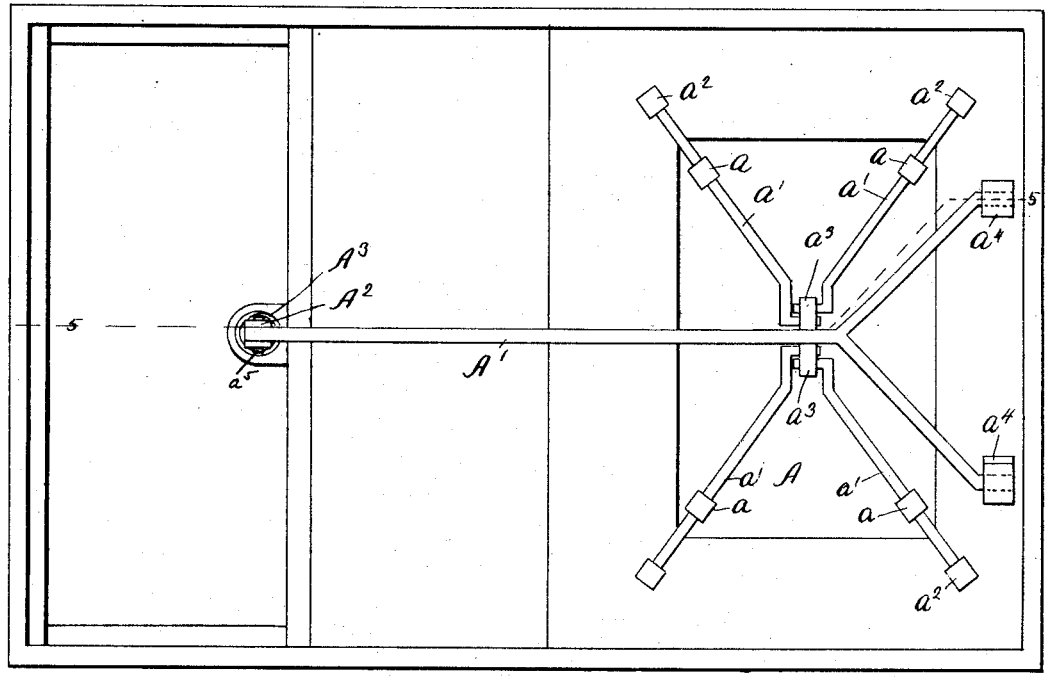
Figure 5:
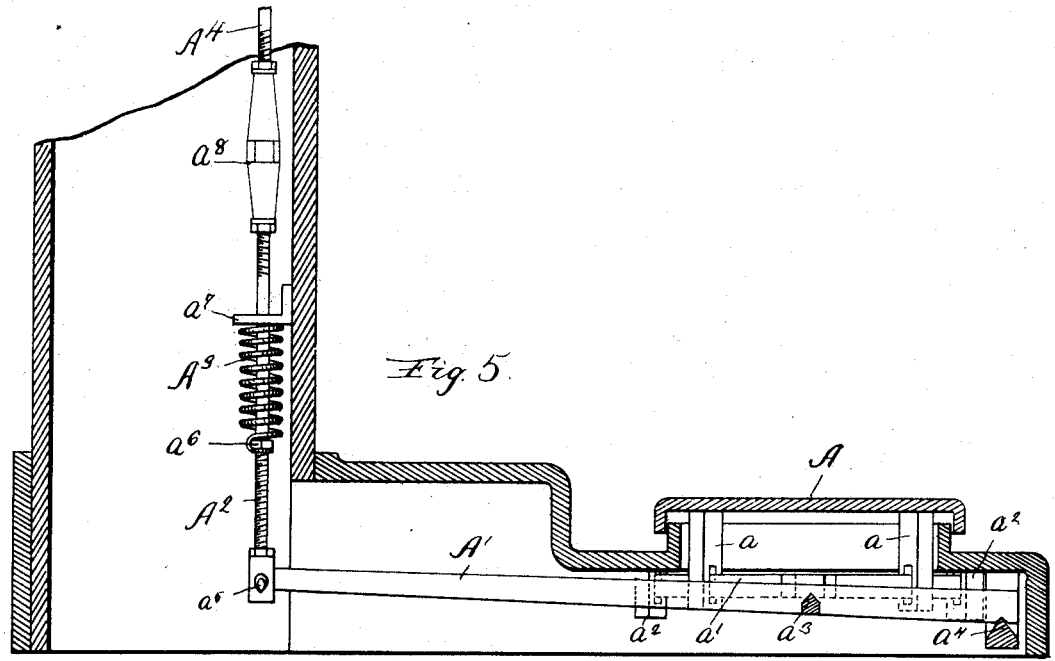

In the drawings, Figure 1 is a front view. Fig. 1$^a$ is a rear view of the weight-indicating dial on a larger scale, and Fig. 2 a side view of my machine. Fig. 3 is a rear elevation of the operative parts of the machine. Fig. 4 is a bottom view of the scale or platform portion of the machine. Fig. 5 is a section on the line 5 5 of Fig. 4. Fig. 6 is a partial vertical section showing the coin-chute and the mechanism connected by the coin to the operative parts. Fig. 7 is a horizontal section of the parts. Fig. 6$^a$ is an elevation, looking from the left to the right of Fig. 6, showing a portion of the part which has the pawl-rest or incline shown at Fig. 6. Fig. 8 is a section of the coin-chute. Fig. 9 is an inside elevation of the parts for throwing the weight-indicating hand into view. Fig. 10 is a section on the line 10 10 of Fig. 9. Fig. 11 shows the weight-indicating hand and the levers for pushing and retracting it. Fig. 12 is a section of a portion of the spirometer or lung-testing device. Fig. 13 shows the mechanism for operating the spirometer-valve, and Figs. 14 and 15 show said valve and its open and closed positions. Fig. 16 is a detail of the electrical connections for giving the current to the person using the machine and for actuating the hand indicating the strength of the current. Figs. 17 and 18 are details of parts of the mechanism shown at Fig. 16. Fig. 19 is a detail of a portion of the mechanism used in giving the electrical shock.

I will now describe those devices of the machine by which the weighing is effected.

In the drawings, A represents the platform of the scale, supported at each corner by slotted vertical supports $a$, resting upon radiating levers $a'$, having knife-edge bearings $a^2$ at their outer ends, and at their inner ends under the center of the platform finding support upon the knife-edge $a^3$, borne upon the lever A'. This lever A' is provided with two knife-edge supports $a^4$, as shown at its forked end, and at the other end is connected by a knife-edge $a^5$ to the rod A$^2$, by which power is carried to the indicating parts of the machine from the lever A' when the latter is depressed by the platform. The rod A$^2$ is furnished with a spring A$^3$, confined thereon between the adjustable nut $a^6$ and a stationary stop $a^7$, secured to the casing of the machine, said spring being attached to both the nut and the stop, so that it acts as a variable balance or counterpoise and to elevate the lever A' and the platform A as soon as the person weighed steps off the latter. The nut $a^6$, being adjustable, permits the tension of the spring being changed whenever requisite, and as such changes in the spring may require adjustment of the length of the connecting parts for carrying motion from the platform to the dial of the scale I make such rod in two parts A$^2$ and A$^4$ and unite them by a female threaded coupling $a^8$, as shown at Fig. 5.

The upper end of rod A$^4$ carries a rack $a^9$, and such rack, through the pinion $b$, which is fast with the sleeve B, actuates said sleeve, and thus moves the arm B', fixed to said sleeve and carrying the sliding indicator B$^2$, around the blackened dial B$^3$, the extent of such movement being proportionate to the weight put upon the scale; but inasmuch as the dial is in front of the indicator nothing of this movement is visible and the indicator cannot be seen until it is pushed or slid out into view by mechanism which can only be brought into use through the good offices of a proper-sized coin inserted at the opening C. This mechanism for pushing the indicator into view consists of the crank-arm G$^5$, borne upon and secured fast to the end of the shaft G$^{13}$, passing through sleeve B, and the pitman G⁶, connecting the arm G⁵ with the indicator B². This shaft G¹³ is compelled to move in one direction with the sleeve B when the latter rotates by the contact of the stop G¹² with the arm G⁵; but after the sleeve has reached the limit of its movement the shaft G¹³ is given a further impulse in the same direction by power communicated to the pulley G, borne upon the shaft G¹³ by the cord E⁵ from the pulley F⁵, as hereinafter described.

The upward or return movement of rack $a^9$ carries with it the dog G⁷ and releases the pawl G⁸ from the ratchet G⁹, borne upon the pulley G', (which may be integral with pulley G, Fig. 10,) the dog being pivoted, as shown, upon the pawl, so that the rack's downward movement does not affect the pawl. This pawl and ratchet are provided to hold the pulleys G G' and other parts on the shaft G¹³ against the power of the weight G¹⁰, the cord $g$ of which winds on one of said pulleys, and the weight is employed to return said shaft to its normal position after each weighing operation, it being enabled to do this while the pawl and ratchet are disengaged. The coin rolls down the chute $c$ from the opening C. The bottom of the chute $c$ is ∧-shaped, while the top is provided with a guiding-groove $c'$, these two features being intended as a safeguard against the use of any but the proper coins. From the chute $c$ the coin drops into the slots $d$ in the adjoining ends of the shafts D D', placed in line with each other, the distance between the inner ends of the two slots being slightly less than the diameter of the coin with which the machine is intended to be used, so that while the coin may drop into the slots it cannot pass entirely through them, but will be detained therein. A smaller coin would, however, be at liberty to drop through the slots, and by so doing be unable to aid in operating the machine. The shaft D projects through to the front of the machine, and is there provided with a crank-handle $d'$, and is also provided with a retracting-spring $d^2$, whereby it may be returned to its normal position after the person using the scale has operated the handle. Stops $d^3$ and $d^4$ limit the movement of the handle to a half-turn. It will now be seen that while the coin is resting in the slots of the shafts a half-turn imparted to the outer shaft will actuate the inner shaft in a like manner, the coin serving to key the two shafts together; also, that by this turning the coin will be brought into position to drop by gravity into the hopper D² when released from the pressure of the shafts. Shaft D' is also provided with a retracting-spring $d^7$, and each of said shafts D and D' carries a cam, (shown at $d^5$ and $d^6$, respectively,) and located nearly upon opposite sides of the shafts when in their coincident position. Each of said cams is adapted to lift the spring-pawl D³, attached to a stationary part of the machine, when in the course of its rotation it passes such pawl. In the normal position said pawl rests upon the cam $d^5$ of the shaft D and rides down the incline thereof as soon as said shaft begins its movement, and it is lifted by and rides entirely over the cam $d^6$ of the shaft D' when the latter comes round. It is now engaged by the abrupt side of the cam $d^6$ and holds the shaft D' against returning to its normal position until said pawl has been again lifted by the cam $d^5$. In this manner a slight interval of time is caused between the returning movements of the two shafts, and the grip or hold of the shafts upon the coin is released at the instant that the shaft D commences to return, so that the coin is then free to drop into the hopper D². The ends of both shafts D and D' are preferably enlarged, as shown, to increase the holding capacity of the coin-slots.

At the further end of the shaft D' a thread is cut and supplied with adjusting-nuts F¹² and F¹³, one at each side of the shaft-bearing F⁹, and by means thereof said shaft is adjusted longitudinally to suit different sizes of coin. Near the center of said shaft a pulley F⁴ is rigidly fastened, so that it moves with the shaft, and adjoining it is a second pulley F⁵. This latter pulley F⁵ has a ratchet F¹² rigidly attached to its side, and is loose on the shaft, but moves therewith when the spring-depressed pawl F³, carried by the shaft D', engages said ratchet. A spring F¹⁰, encircling the shaft D', is secured at one end to the shaft and at the other to the loose pulley F⁵. This spring rotates the pulley F⁵ and causes it to take up the slack in the cord E⁵, caused by the rotating of the pulley G to unwind the cord when a person puts his weight upon the scale-platform. A further rotation is then given pulley F⁵ by the keying together of shafts D and D' by the coin and the rotating of shaft D by the crank $d'$, the pawl F³ (which normally rests upon the stationary inclined surface F²) engaging the ratchet F¹² in this movement and carrying the pulley. By such further rotation of said pulley I actuate the parts by which the indicator-hand B² is pushed out into view beyond the outer edge of the dial B³.

It will be seen from the foregoing that when a person gets on the platform he causes the rack $a^9$ to descend, thereby actuating the pinion $b$ and turning the arm G⁶, carrying the pointer or indicator hand, into proper position, so that the weight will be indicated on the dial when such pointer is pushed into view. The person being weighed now inserts the proper coin at the opening C, which, falling into the slots $d$ of the shafts D and D', enables him to turn the shafts by means of the crank $d'$, and thus actuate the mechanism for pushing out the pointer, and in so doing to wind up the weight G¹⁰. As he steps off the platform or removes part of his weight therefrom, the rack $a^9$ commences to ascend, releasing the pawl G⁸, and thereby allowing the pointer to move back out of sight in obedience to the weight G¹⁰. Of course the arm carrying the pointer will only return to the zero position with the entire removal of all weight from the platform, and this it will do by the return movement of the rack $a^9$. The descent of the weight winds up the cord $E^5$ on the pulley G and draws it from the pulley $F^5$, thus tightening the spring $F^{10}$ and putting it in readiness for the next operation. In the meantime both the shafts D and D′ have been rotated back to their position of rest by their retracting-springs, this being permitted without affecting the pulley $F^5$, as the ratchet $F^{12}$ is calculated to carry said pulley in the forward direction only.

The means I take to prevent the weighing of two or more persons by inserting a single coin are the following: first, the instant retracting of the indicator by the removal of the weight or of a portion of it from the platform, and, second, the reduction of the scale-platform to such a size as will hold a single person only.

I will now proceed to describe the lung-testing apparatus. A bulb H, preferably of glass, is provided near the top of the casing, and extending from its upper portion is a tube H′. Connected with this tube is the upwardly-inclined tube $H^2$, and between such inclined portion and the horizontal portion H′ is a vertical tube prolonged into the branch $H^3$. All these tubes and the bulb are filled with liquid, so that the liquid stands sufficiently high to sustain the float J in branch $H^3$ substantially in the position indicated at Fig. 12. Float J preferably has a stem J′, and the cover of the vertical tube is provided with air-vents $J^5$. The tube $H^2$ is extended to and connected with the flexible pipe $H^4$, which is long enough to be within convenient reach of a person standing on the platform of the scale. Extending from the bottom of bulb H is another tube $H^5$, Fig. 3, connecting with the bent tube $H^6$, leading into the bottom of the test or graduated chamber K, Fig. 1, where the user sees the result of his efforts at blowing into the tube $H^4$. In this tube $H^5$ a check-valve $H^7$ is placed. (Shown in detail in Figs. 14 and 15.) This valve is turned by the user, who has duly inserted his coin in the machine, when he turns the crank d′ into the open position at Fig. 14, which allows the fluid to pass freely upward toward the graduated chamber, such turning being due to the cord E′ passing from pulley $F^4$ to the pulley $H^8$, Fig. 13, on the journal $h^7$ of the valve. A spring-pawl $H^9$ engages a ratchet $H^{10}$ on the valve-journal and holds the valve open until a cord $H^{11}$, attached to the outer end of the pawl and also to the rack $a^9$, Fig. 3, is actuated by the ascending of said rack when the weight is removed from the scale-platform, and thus caused to lift the pawl $H^9$ from the ratchet $H^{10}$. This allows the valve to yield to its spring $h^8$, Fig. 13, and to turn back to its original position. (Shown at Fig. 15.) To the top of the graduated test-chamber a tube K is attached, which connects with and supports an expansible rubber bulb K′, wherein the air confined above the fluid in said chamber may find space when the fluid is raised in the operation of the apparatus.

The operation is as follows: When the valve is in its normal position, (shown at Fig. 15,) the fluid cannot pass upward, and hence no amount of blowing at the mouth-piece will effect any result; but when the coin has been inserted and the valve $H^7$ turned to the position of Fig. 14 the fluid is free to rise into the test-chamber. The valve now holds such portion of the fluid as passes above it against any return until the valve is reversed by its spring, thus giving the user ample opportunity to observe the results of his blowing at the exposed face of the test-chamber. During the blowing the float J is held up by the air-pressure; but at any break therein—such, for instance, as would be caused by a person stopping to take a second breath—the float will fall to its seat at $J^2$, the fluid having been driven out of the way, and thus shut off communication between the tubes H′ and $H^2$. In this state of the apparatus no further blowing will be effectual until the valve $H^7$ has been reversed and the fluid is allowed to return into the passages and lift the float to its normal position. No air can escape at the vents $J^5$ except such as may be above the fluid in the branch $H^3$, as the float will be forced up by the air-pressure and close the vents.

For the purpose of administering the electrical current to the user, two handles $R^2$ and $R^3$, connected together at r, but insulated from each other, are provided at the outside of the casing in convenient position to be grasped by the person standing on the platform A. These handles are mounted upon crank-arms $O^{14}$ and are intended to be grasped one by each hand, so that the electrical circuit of which the handles form a part will be complete when they are thus taken hold of. The swinging motion of which the handles are capable by reason of their attachment to said arms $O^{14}$ is intended to increase the power of the current, as hereinafter set forth. The electrical connections to the handles are through the bolts P and P′, by which the brackets $O^{15}$, to which arms $O^{14}$ are pivoted, are held to the casing, and the wires $O^8$ and $O^9$, extending to said bolts from the poles of the secondary coil of an ordinary medical induction-coil $O^{25}$.

O is a battery, one pole of which is connected by the wire o to one of the posts or wires $O^3$ of the induction-coil. The other pole of the battery is connected by the wire o′ to the bearing-block O′. From the other wire or post $O^2$ of the induction-coil extends a wire $o^3$ to the bearing-block $O^4$. There is no normal connection between these bearing-blocks O′ and $O^4$, so that the current remains broken until such connection is made. In bearing-block O′ and in a companion block $O^{17}$ is supported a bar $O^6$, having freedom to oscillate in such bearings, and also provided with a spring $N^{10}$, tending to turn it into alignment with the projection $O^{26}$, its normal position being shown at Fig. 3. It is further provided with a crank-arm $N^8$, to which the cord $N^9$ is attached. Upon this bar is a slide $O^5$, attached to and operated by the cord $O^{16}$. Back of the slide said cord passes onto and the slack in it is taken up by the spring-actuated pulley $O^{18}$, mounted in block $O^{17}$. The cover of the induction-coil carries a rack $O^7$, but insulated from it at $O^{21}$, said rack working in the pinion $O^{22}$ in block $O^4$, the shaft of such pinion carrying a ratchet $N'$, controlled by the pawl $N^2$, which is thrown out of engagement by the stop $N^5$ upon the cord $O^{16}$. Said cord $O^{16}$ is attached at its other end to pulley $O^{13}$ and drawn onto said pulley whenever the handles $R^2 R^3$ are depressed by the following devices: A cord $r'$, Fig. 19, passes from the handles to a pulley $O^{11}$ within the case and rotates said pulley when the handles are operated. The shaft of this pulley carries also the pulley $O^{13}$, so that the operation just mentioned occurs with each actuation of the handles. A spring $O^{12}$ retracts said shaft after each operation, thereby unwinding the cord $O^{16}$ and winding up the cord $r'$. The rack $O^7$ carries a projection $O^{26}$, which is intended to contact with the slide $O^5$ whenever the bar $O^6$ is oscillated to bring the slide and said projection into alignment and when said slide is moved toward the projection by its cord $O^{16}$. This contact completes the circuit between the two poles of the battery, and it will also be seen that the rack will be thus caused to move with the slide and draw off the cover of the induction-coil, and thereby increase the strength of the current according to the extent to which the cover is drawn away. It will be further noticed that the extent to which the current is thus increased is entirely within the control of the person using the apparatus, because it is both caused and regulated by the depressing of the handles, which may be greater or less, at pleasure.

It is of course impossible to use the electrical apparatus without depositing the coin and turning the crank $d'$, because until that is done the slide $O^5$ cannot be turned into alignment with the stop $O^{26}$, and without this the current cannot be completed. I also provide means whereby the current may be shut off after the apparatus has been used a reasonable length of time. These features I now describe.

When the coin is inserted and the handle $d'$ turned, the cord $E^2$ is wound upon the pulley $F^4$, and thereby caused to draw the pawl $P^{15}$ away from pin $P^{18}$, carried by the gear S, the latter being one of a train of gears $S' S^2 S^3$, &c., forming a time-movement actuated by weights $P^9$, and designed to be wound up at intervals. The time-movement now starts, and in so doing the pin $P^{19}$ on the gear $S'$, which normally holds the lever $P^{20}$ in the position indicated at Fig. 3, releases said lever and allows it to yield to the strain put upon the cord $N^9$ by the spring $N^{10}$, which acts to oscillate bar $O^6$, and thus draw on said string. The movement of the gears $S S' S^2 S^3$ is quickly stopped, however, by the pivoted dog $P^{21}$, the end of which engages said pin $P^{19}$; but it has been sufficient to bring the slide $O^5$ into alignment with the stop $O^{26}$ and ready for actuation by the cord $O^{16}$, as will be understood. The parts now remain in this position until the user depresses the handles $R^2 R^3$ and completes the circuit by bringing said slide and projection into contact. In depressing said handles, and the consequent actuation of pulley $O^{11}$, a cam projection $m$ upon said pulley, Figs. 3 and 19, which normally acts upon the dog $P^{21}$ to keep it in the position given at Fig. 3, releases said dog and allows it to swing under the power of the spring $P^{22}$ and away from the path of the pin $P^{19}$, so that the time-movement then resumes motion. The movement is timed to run some definite period—say twenty or thirty seconds—and is then stopped by the engagement of the pawl $P^{15}$, which has in the meantime resumed its original place with the pin $P^{17}$ upon the side of the wheel S diametrically opposite to pin $P^{18}$. At this time, also, the pin $P^{16}$ upon the side of the wheel $S'$ diametrically opposite to pin $P^{19}$ has assumed the position occupied by pin $P^{19}$ in Fig. 3 with lever $P^{20}$ under it, and the dog $P^{21}$ has reassumed its position of rest shown in said figure. These parts are now in readiness for another operation, the current being broken by the oscillation allowed to the bar $O^6$, and no further current can be obtained without inserting another coin, whether the grasp of the handles is maintained or not. The current used is indicated by a hand V upon the dial $V'$, the hand being actuated by the cord $V^2$, wound upon its shaft $v$ and connected to the pulley $V^3$, Figs. 3 and 17, upon the shaft $o^{22}$ of the pinion $O^{22}$. This indicator does not fall back to zero until the handles are released and the stop $N^5$ upon the cord $O^{16}$ strikes the pawl $N^2$ and allows the spring $V^4$ upon the shaft of pinion $O^{22}$ to actuate said shaft in a reverse direction and push the rack and coil-cover back to place, such reverse movement of the shaft unwinding the cord $V^2$ from the pulley $V^3$ and allowing the weight $V^5$, attached to the end of the cord at the indicator-shaft, to take up the slack so created.

I claim—

1. In a coin-controlled machine, the combination of weighing devices, a spirometer, indicators for the same, means for controlling said weighing devices and spirometer to normally prevent their use, a slotted shaft connected with and adapted to release said controlling means, a second slotted shaft placed end to end with the former shaft, a coin-chute adapted to deliver the coin to the slots of said shafts, a receptacle to receive coins, and means for retracting said shafts, one shaft starting back slightly in advance of the other, whereby the coin is released and dropped into the receptacle, substantially as specified.

2. In a coin-controlled machine, the combination of weighing devices, a spirometer, an electrical generator, and suitable conductors for the electrical current, indicators for the same, means for controlling the weighing devices, the spirometer, and the electrical devices normally to prevent their use, a slotted shaft connected with and adapted to release said controlling means, a second slotted shaft placed end to end with the former shaft, a coin-chute adapted to deliver the coin to the slots of said shaft, a receptacle to receive the coin, and means for retracting said shaft, one shaft starting back slightly in advance of the other, whereby the coin is released and dropped into the receptacle, substantially as specified.

3. In a coin-controlled machine, the combination of weighing devices, a spirometer, an indicator for the same, an indicating-dial for the weighing devices provided with a normally-concealed indicating-hand, an electrical generator, and suitable conductors for the electric current, an indicator for the same, means for controlling the weighing devices, the spirometer, and the electrical devices to normally prevent their use, a slotted rotatory shaft adapted to receive and be operated through the agency of a coin, and connections between said shaft and said controlling means, whereby the weighing devices, spirometer, and electrical conductors may be released for use, substantially as specified.

4. In a machine of the general character herein shown, the combination, with the coin-chute, of two normally-independent shafts capable of a half-rotation with each coin placed end to end and having coincident slots in their abutting ends forming a slot shorter than the diameter of the coin, whereby said slotted shafts are adapted to receive and detain the coin until they are turned a half-rotation, a handle for imparting such half-rotation secured to one of said shafts, testing devices, as described, and connections from the other shaft to the said testing or measuring devices, for setting them so that they can be used, substantially as specified.

5. In a testing-machine, the combination of a series of testing apparatuses, a shaft slotted at one end and mechanically connected to said apparatuses, a spring which controls said shaft, a pawl or stop which temporarily detains the shaft when partly rotated, a second shaft also slotted and placed with its slotted end abutting the slotted end of the first shaft, the slots being normally coincident, a handle for applying power to the second shaft, stops for limiting the rotation, and a coin-guide-way delivering the coin into said slots, substantially as specified.

6. The combination, with the weighing and indicating mechanism of a coin-controlled scale, of the coin-chute and two independent slotted shafts, one of which is longitudinally adjustable, means for turning one of said shafts, mechanical connections from the other shaft to said mechanism, whereby the latter is permitted to indicate the weight, and means for adjusting said adjustable shaft relative to the diameter of the coin, substantially as specified.

7. The combination of the coin-chute and two independent slotted shafts placed end to end, said shafts having each a retracting-spring and one of them having a device whereby it may be turned, a pawl for temporarily detaining the other shaft when partly rotated, and a projection carried by the former shaft for releasing said pawl, substantially as specified.

8. The combination, with the slotted shafts placed end to end, of the coin-chute delivering the coin to the slots of the shafts, means for applying power to one of said shafts, a hopper below the shafts to receive the coin, and means for retracting said shafts, one starting back slightly in advance of the other, whereby the coin is released and dropped into the hopper, substantially as specified.

9. In a coin-controlled scale, the combination of a normally-concealed rotating and sliding indicator hand or pointer for indicating the weight, and mechanism for pushing the hand into view, substantially as specified.

10. The combination of the dial, the indicating hand or pointer normally concealed by the dial, and the mechanism for pushing the hand radially into view, substantially as specified.

11. In a coin-controlled scale, the combination of platform A, adapted to hold a single person only, a normally-concealed rotating and sliding indicating hand or pointer, and mechanism for pushing such hand into view and retracting it, such mechanism being connected to the platform and actuated to retract the hand by the removal of either the whole or a portion of the weight from the platform, substantially as specified.

12. The combination of platform A, the dial, the indicating-hand normally concealed by the dial, and mechanism for operating said hand connected to and operated from the platform, substantially as specified.

13. The combination of the normally-concealed indicating-hand and mechanism for operating it with the platform actuating said mechanism and the coin-receiving mechanism controlling said hand-operating mechanism, substantially as specified.

14. The combination, with the normally-concealed indicator-hand, the mechanism for pushing it into view, and the shaft by which said mechanism is carried, of pulley G, cord $E^5$, pulley $F^5$, and the slotted shafts D D', substantially as specified.

15. The combination, with the slotted shafts D and D' and their retracting-springs, of the spring-pawl $D^3$ and the cams $d^5$ and $d^6$ upon the shafts, substantially as specified.

16. The combination, with the slotted shafts D and D' and their respective retracting-springs, of the spring-pawl $D^3$ and cam $d^6$, for delaying the return of one of the shafts, substantially as specified.

JOHN F. BOWER.

Witnesses:
H. M. MUNDAY,
EDMUND ADCOCK.